US010504251B1

(12) United States Patent
Mendonca et al.

(10) Patent No.: US 10,504,251 B1
(45) Date of Patent: Dec. 10, 2019

(54) DETERMINING A VISUAL HULL OF AN OBJECT

(71) Applicant: A9.com, Inc., Palo Alto, CA (US)

(72) Inventors: Paulo Ricardo dos Santos Mendonca, Seattle, WA (US); Yifan Xing, Seattle, WA (US)

(73) Assignee: A9.com, Inc., Palo Alto, CA (US)

( * ) Notice: Subject to any disclaimer, the term of this patent is extended or adjusted under 35 U.S.C. 154(b) by 187 days.

(21) Appl. No.: 15/840,876

(22) Filed: Dec. 13, 2017

(51) Int. Cl.
*G06T 7/11* (2017.01)
*G06T 11/00* (2006.01)
*H04N 5/247* (2006.01)

(52) U.S. Cl.
CPC .............. *G06T 11/006* (2013.01); *G06T 7/11* (2017.01); *H04N 5/247* (2013.01)

(58) Field of Classification Search
CPC . G06T 11/60; G06T 7/10–7/187; H04N 5/247
See application file for complete search history.

(56) References Cited

U.S. PATENT DOCUMENTS

| 8,254,633 | B1 * | 8/2012 | Moon | G06K 9/00771 |
| | | | | 382/103 |
| 9,165,199 | B2 * | 10/2015 | Zhu | G06K 9/00201 |
| 9,489,762 | B2 * | 11/2016 | Jenkins | G06T 15/20 |
| 9,600,927 | B1 * | 3/2017 | Poursohi | G06T 15/60 |
| 2002/0159628 | A1 * | 10/2002 | Matusik | G06T 7/557 |
| | | | | 382/154 |
| 2003/0034971 | A1 * | 2/2003 | Fujiwara | G06T 17/30 |
| | | | | 345/420 |
| 2003/0231174 | A1 * | 12/2003 | Matusik | G06T 9/001 |
| | | | | 345/419 |
| 2004/0096096 | A1 * | 5/2004 | Huber | G06K 9/00201 |
| | | | | 382/152 |
| 2005/0088515 | A1 * | 4/2005 | Geng | G06T 7/564 |
| | | | | 348/47 |
| 2005/0226484 | A1 * | 10/2005 | Basu | G06T 11/005 |
| | | | | 382/131 |
| 2006/0066614 | A1 * | 3/2006 | Grau | G06K 9/00201 |
| | | | | 345/423 |
| 2007/0035539 | A1 * | 2/2007 | Matsumura | G06T 7/564 |
| | | | | 345/419 |
| 2007/0053491 | A1 * | 3/2007 | Schildkraut | A61N 5/1049 |
| | | | | 378/65 |
| 2009/0304265 | A1 * | 12/2009 | Khan | G06T 15/205 |
| | | | | 382/154 |

(Continued)

*Primary Examiner* — Sean T Motsinger
(74) *Attorney, Agent, or Firm* — Hogan Lovells US LLP

(57) ABSTRACT

Objects can be rendered in three-dimensions and viewed and manipulated in an augmented reality environment. For example, contour information for an object represented in image data for a plurality of viewpoints can be obtained. A region of space that includes the object can be partitioned into a plurality of sub regions. A position of each sub region can be identified in the image data for each viewpoint. A value can be determined for each sub region indicating whether that sub region as projected in the image data is within the contour of the object. Once the total values for each sub region are determined, a visual hull technique can be used to generate a visual hull of the object based on the values. Thereafter, the visual hull can be used to generate a three-dimensional representation of the object for a number of different viewpoints.

20 Claims, 7 Drawing Sheets

(56) References Cited

U.S. PATENT DOCUMENTS

| | | | |
|---|---|---|---|
| 2010/0030578 A1* | 2/2010 | Siddique | G06Q 10/0637 705/3 |
| 2010/0054563 A1* | 3/2010 | Mendonca | A61B 6/032 382/131 |
| 2011/0007072 A1* | 1/2011 | Khan | G06T 17/00 345/420 |
| 2011/0128354 A1* | 6/2011 | Tien | G06T 7/80 348/50 |
| 2011/0182495 A1* | 7/2011 | Sun | G06T 7/0004 382/141 |
| 2011/0210915 A1* | 9/2011 | Shotton | G06K 9/00369 345/157 |
| 2011/0254950 A1* | 10/2011 | Bibby | G06T 7/11 348/135 |
| 2013/0156329 A1* | 6/2013 | Szeliski | G06K 9/00214 382/218 |
| 2014/0119604 A1* | 5/2014 | Mai | G06K 9/00624 382/103 |
| 2014/0119654 A1* | 5/2014 | Taylor | G06T 7/254 382/173 |
| 2014/0307920 A1* | 10/2014 | Holz | G06K 9/00335 382/103 |
| 2015/0339828 A1* | 11/2015 | Djelouah | G06T 7/194 382/173 |
| 2016/0210525 A1* | 7/2016 | Yang | G06K 9/0063 |
| 2016/0223659 A1* | 8/2016 | Mandelert | G01S 7/539 |
| 2016/0301910 A1* | 10/2016 | Lucas | G06T 17/00 |
| 2018/0025250 A1* | 1/2018 | Chen | G06K 9/342 382/292 |
| 2018/0247393 A1* | 8/2018 | Ohga | G06T 5/006 |

* cited by examiner

DETERMINING A VISUAL HULL OF AN OBJECT

BACKGROUND

Users are increasingly purchasing items over the Internet. Accordingly, when a customer receives an item, it may be the first time he or she has viewed the item in person. The item may not look the same way the customer envisioned based on photographs viewed online. For example, a customer may order a lamp to place on an end table, but when the ordered lamp is physically placed on the table, the customer might not be pleased with its size or style, particularly relative to other items in the room. It may be beneficial to view the lamp on the end table in an augmented reality context before ordering it. Augmented reality implementations, however, are only effective if the object in question can be properly rendered in three dimensions. If the scale is off or the object is not rendered accurately from certain angles, then the customer cannot get a true sense of how the object will look in her home. When a user has to guess how a physical object will look, she will often end up with an item that does not fit her needs properly.

BRIEF DESCRIPTION OF THE DRAWINGS

Various embodiments in accordance with the present disclosure will be described with reference to the drawings, in which.

DETAILED DESCRIPTION

Figure 1:
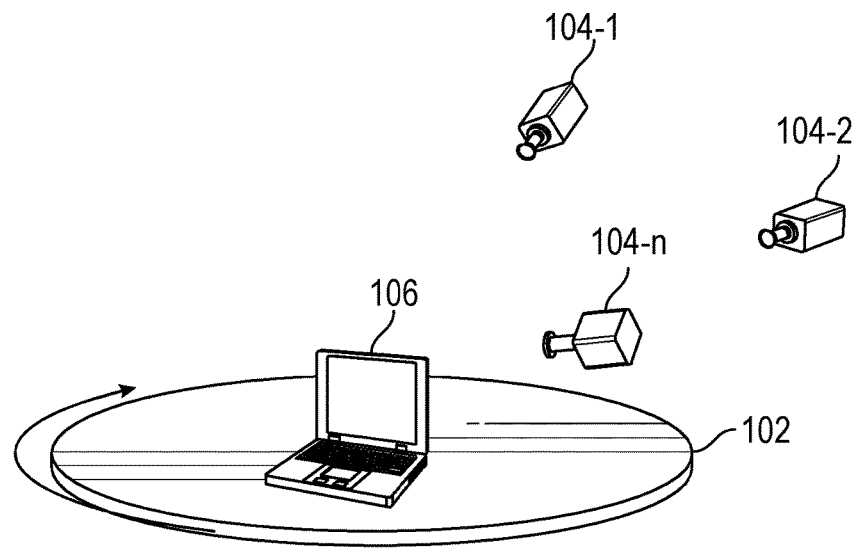
FIG. 1 illustrates an example image capture system that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to capturing image information using an electronic device. In particular, various embodiments provide for generating a visual hull from images captured by cameras positioned with respect to an object, which can be used for the reconstruction of three-dimensional models of the object.

For example, one or more images representing various viewpoints of an object can be captured using a plurality of cameras. The object can include, for example, various products and/or items including two and three-dimensional items. The objects can be associated with information that describes a size and a shape of an object, as well as position information that describes relationships between different aspects of the object including information describing a surface area and volume of the object and position information describing positional relationship between the aspects with respect to a coordinate system. In various embodiments, the surface information can be obtained and/or determined. For example, one or more computer vision techniques can be used to determine a surface of the object. In another example, the surface information can be retrieved from a data base or source that includes such information. In yet another example, the surface can be determined using at least one computer vision approach on the one or more images. The cameras can be positioned with respect to the object. In various embodiments, the object may be positioned on a surface, suspended in air, etc. The cameras can be associated with camera parameters, including intrinsic parameters (e.g., focal length, aspect ratio, etc.) and extrinsic parameters (e.g., camera orientation information such as a position component, a rotational component, and a translation component that defines the location and orientation of a camera with respect to a coordinate system such as a reference coordinate system). The intrinsic parameters allow a mapping between camera coordinates (e.g., coordinates in the reference coordinate system) and pixel coordinates in an image captured by a camera. A camera model, or camera parameters, can allow a mapping from the reference coordinate system to image coordinates. This is, for example, a 3D to 2D transform. The image(s) can be analyzed, for example, using a segmentation approach to generate a plurality of segmentation masks. A segmentation mask can include a silhouette, outline, or contour of the object. An integral image of each segmentation mask can be determined. In an embodiment, an integral image can be used to calculate a number of or a sum of values (pixel values) in a given segmentation mask—or a rectangular subset of a grid (the given segmentation mask). It can also be used to calculate the average intensity within a given image. In various embodiments, at least one summed-area table technique can be used to determine an integral image.

Information about a coordinate system associated with the object or a reference point is obtained. The information can be used to define a region space that includes the object. The region can be partitioned into a plurality of sub regions. In an embodiment, the sub regions or partitions can include a voxel. Initially, each sub region can be associated with a value of zero. Each sub region can be projected onto each segmentation mask using the set of camera parameters. The projected sub regions can be associated with pixel locations on each segmentation mask. For each projection, a window having a shape can be defined. The shape of the window can be determined based on a measure of uncertainty of the calibration of the camera associated with the corresponding image or by a measure of the uncertainty in the segmentation mask. A probability of each sub region being inside an object's surface can be determined. In an example, the probability can be based on a ratio of a number of the pixels of the segmentation mask inside the window within the contour to a total number of pixels inside the corresponding window can be determined. This can repeat for each sub region for each segmentation mask. Individual probabilities can be compared to a threshold. Probabilities for each sub region that satisfy the threshold can be added to determine a probability of occupancy or other such scalar value.

Thereafter, a total probability of occupancy can be used to determine a visual hull of the object.

Various other such functions can be used as well within the scope of the various embodiments as would be apparent to one of ordinary skill in the art in light of the teachings and suggestions contained herein.

Many electronic and computing device offer three-dimensional (3D) imaging using at least one pair of high resolution matched cameras. One such image capture system to obtain images of objects is illustrated in FIG. 1. In the example shown in FIG. 1, an image capture array 100 captures a number of images of an object. The image capture array 100 includes a number of cameras 104-1, 104-2, . . . 104-n or other image capture devices, which are positioned about a platen 102 or other such device capable of holding or suspending an object. The platen can include a rotating turntable such as a circular revolving plate or other such platform. Although shown is a platen, the object can be positioned on any surface or otherwise suspended. The image capture devices can include RGB cameras, infrared sensors, and/or other devices. The illustrative cameras 104-1, 104-2, . . . 104-n can capture images of the platen 102. An object 106 for which a 3D reconstruction is desired can be positioned on the platen 102. The cameras 104-1, 104-2, . . . 104-n capture images of the object 106, the platen rotates, and additional images can be captured from different viewpoints. The number of rotations and the number of cameras 104-1, 104-2, . . . 104-n can vary. For example, in various embodiments, 19 cameras and 72 rotations can be used. This results in 1,368 object images, one per camera per platen position.

Figure 2:
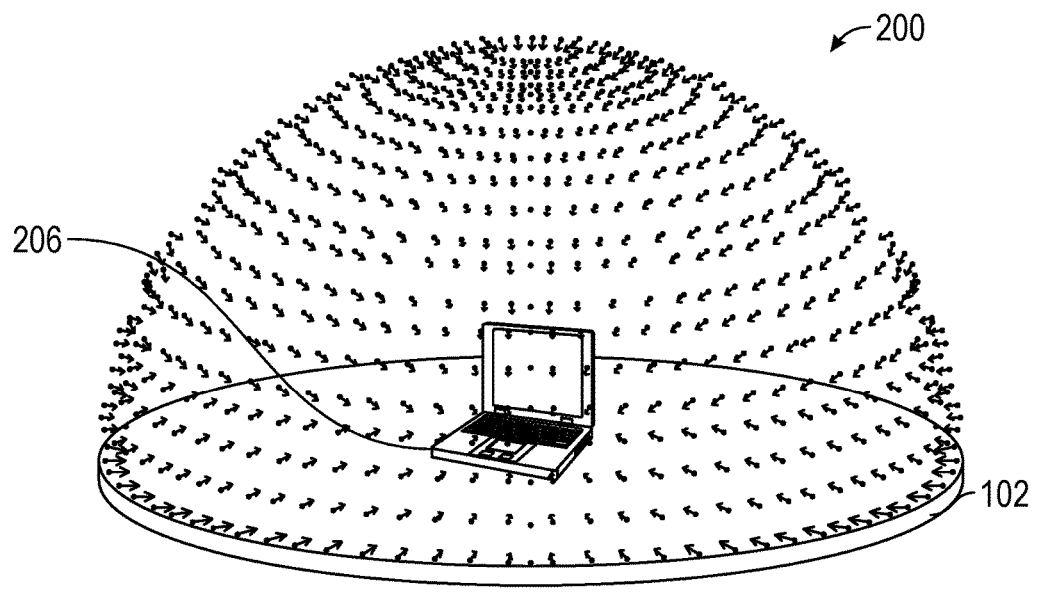
FIG. 2 illustrates an example process of capturing images using the image capture system of FIG. 1 that can be utilized in accordance with various embodiments.

As illustrated in FIG. 2, this can result in capturing object images from a number of different viewpoints in a hemisphere 200 about the object 206. The "density" of this viewpoint hemisphere 200, or total number of viewpoints contained, can depend on the number of image capture devices used and the number of platen positions at which images are captured. For example, in an embodiment the cameras are stationary. That is, only the object to be rendered moves during the image capture process. It should be noted, however, that in certain embodiments the cameras can be moved about the calibration object. In the situation where the platen is rotated, a set of images is captured at an initial platen position, one image for each camera. When the platen 102 rotates to a second platen position, a second set of object images is captured. When capturing image data to reconstruct a 3D representation of the object, each of the cameras captures an image at approximately the same time. As described in FIG. 2, a hemisphere of viewpoints can be captured around an object, portraying the object from a plurality of different angles. For example, 19 cameras can capture images at each of 72 platen positions for a total of 1,368 viewpoints represented. In an embodiment, after object images are captured, segmentation masks can be created based on the object images, and an object mesh structure can be created based on the segmentation masks.

Figures 3A, 3B:
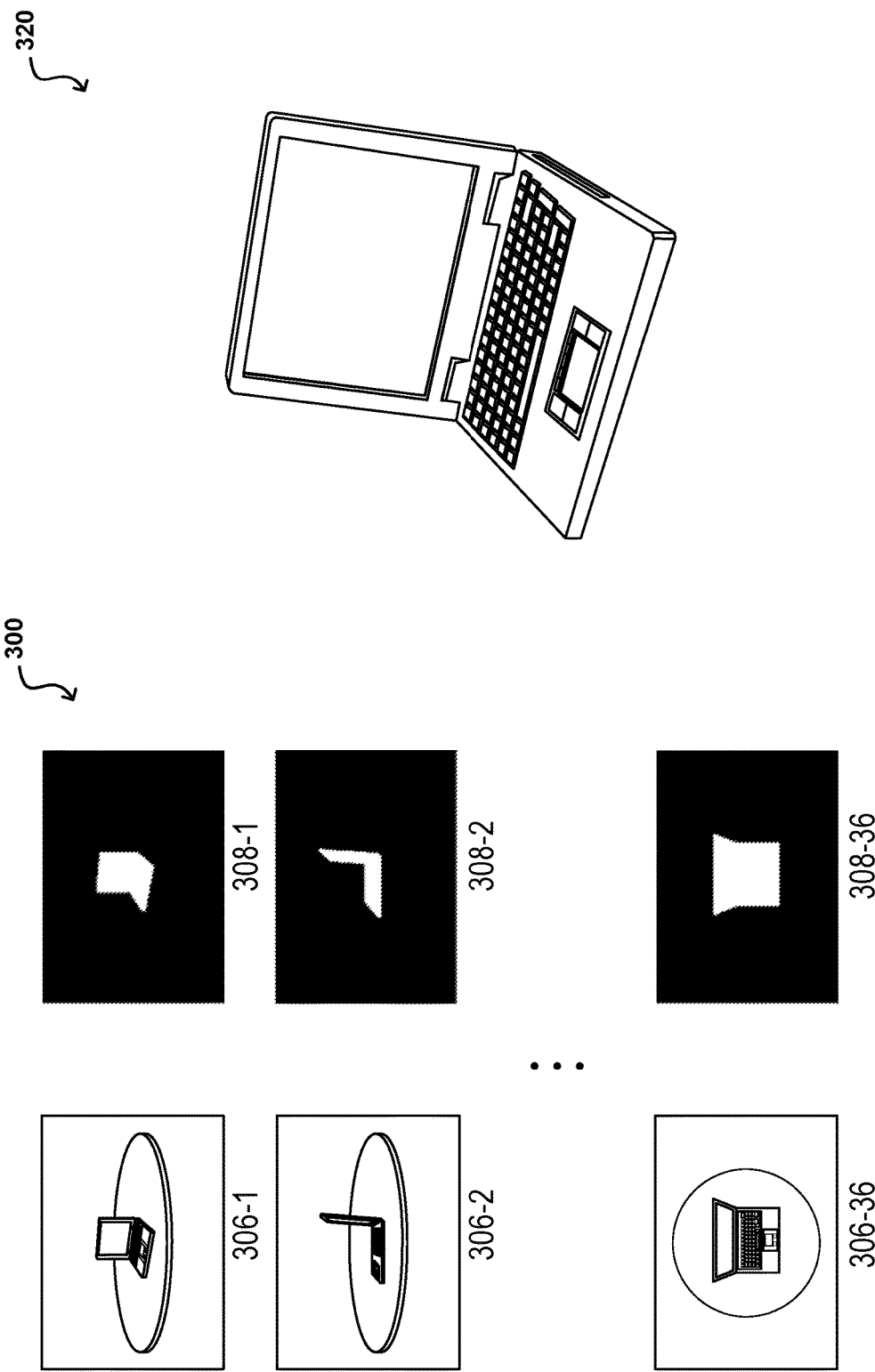
FIGS. 3A and 3B illustrate an example image and segmentation mask that can be utilized in accordance with various embodiments.

FIGS. 3A and 3B illustrate example images and segmentation masks that can be utilized in accordance with various embodiments. As illustrated in example 300 of FIG. 3A, object images 306-1, 306-2, . . . 306-36 are captured portraying the object from various viewpoints. In this example, segmentation masks 308-1, 308-2, . . . 308-36 that illustrate the contour of the objects represented in images 306-1, 306-2, . . . 306-36 can be determined. Pixels inside the contour can be a first color and pixels outside the contour can be a second color. For example, the first color can be white and the second color can be black; however, other colors and/or variations of the colors can be possible. In an embodiment, conventional visual hull generation techniques including those by Aldo Laurentini, shape-from-silhouette techniques, and so forth can be used to generate a visual hull of the object based at least in part on the object images. For example, based on a viewpoint of a camera, a shape that includes the representation of the object for that camera can be determined. The shape can include, for example a cone like shape. Inside the shape includes the object, outside the shape no object. These shapes can be determined for each camera at each viewpoint to generate a plurality of shapes, where the shapes at least partially intersect. In an embodiment, the object may be included inside the intersection of shapes. Accordingly, the intersection of shapes can create a regional space where the object can be. This regional space can be the visual hull and can be used to generate a three-dimensional reconstruction of the object.

In accordance with various embodiments, the cameras can be aligned mechanically to the extent possible and/or practical. There still can be at least some misalignment, however, such that it can be desirable to improve the process for generating the visual hull to ensure an accurate three-dimensional reconstruction of the object. Conventional approaches for generating the visual hull are sensitive to any error in the position of cameras and thus fail to adequately handle misalignment between cameras, even after calibration of those cameras. Conventional approaches are also sensitive to segmentation errors (e.g., delineation of an object's outline), that is, determining the contour of an object. Accordingly, approaches in accordance with various embodiments provide for generating a visual hull from images captured by cameras positioned with respect to an object, which can be used for the reconstruction of 3D models of objects.

In various embodiments, information about a coordinate system corresponding to an object is obtained. The information can include position information for various positions within a region in space that includes the object. The region can be in the shape of, for example, a cube or other such shape, and can be associated with dimension information describing the dimensions of the cube. A coordinate system can be associated with the object or other reference point. That is, the origin of a three-dimensional coordinate system can be located on the object or reference point. As described, an object can include, for example, various products and/or items including two and three-dimensional items. The objects can be associated with information that describes a size and a shape of an object, as well as position information that describes relationships between different aspects of the object including surface information describing a volume of the object and position information describing positional relationship between the aspects with respect to a coordinate system. In various embodiments, the object may be positioned on a surface, suspended in air, etc. The region can be partitioned into a regular grid or an octree. This can include partitioning the region into a plurality of elements or shapes, e.g., cubes or voxels. In an example, the elements can be partitioned into a 100×100 cubic grid. The information for the coordinate system can include position information for the plurality of elements, such as where those elements are positioned within the coordinate system. In certain embodiments, the elements of the partition can be referred to as a voxel V or pixel. In an embodiment, a scalar field in the region can be defined. For example, for a region R, each voxel can have a value 0 such that the region for all voxels is zero.

A set of camera parameters can be obtained or otherwise determined. The set of camera parameters can be determined, for example, using a camera calibration technique. Example camera calibration techniques include linear camera optimization techniques, non-linear camera optimization techniques, as well any available techniques to those skilled in the art. Such techniques can include techniques to minimize algebraic error, for example. In an embodiment, measuring algebraic error can include using camera parameters to determine three-dimensional locations in a reference coordinate system (e.g., a coordinate system associated with a turntable) of feature points from corresponding features in a two-dimensional camera coordinate system and comparing the determined three-dimensional locations to the actual three-dimensional locations of those features in the reference coordinate system, where the difference between the determined locations and the actual locations can be the algebraic error. The set of camera parameters can be associated with a confidence or uncertainty value. The confidence value can indicate a level of confidence associated with the camera parameters. The set of camera parameters can include, for example, offset values for the points accounting for intrinsic parameters (e.g., focal length, image sensor format, principal point, etc.) of a camera and extrinsic parameters (e.g., coordinate transforms from 3D world coordinates to 3D camera coordinates) of a camera, and in at least some embodiments a model (e.g., a "rectifying model") of the camera(s) capturing that image. In an embodiment, the rectifying model can include transforms or adjustments to be made to an image in order to reduce error in the image. In various embodiments, error can include, for example, misalignment error, reprojection error, algebraic error, etc.

One or more (e.g., a plurality) of images can be captured for different viewpoints of the object, In the situation where the object is positioned on a turntable, the images can be captured for different positions of the turntable, one image for each camera. Segmentation masks can be created based on the images. A segmentation mask be used to determine a contour of an object represented in an image. For example, a segmentation mask can have value 0 at pixels outside an object's contour and value 1 at pixels within the object's contour. The difference in values can be used to determine the contour of the object. In accordance with various embodiments, individual segmentation masks can be associated with a confidence or uncertainty value. In certain embodiments, an integral image of each segmentation mask can be generated. In accordance with various embodiments, an integral image A of an image B can be an image with the same dimensions as image B such that that the value of image A at pixel (x, y) is the sum of the values of image B at the pixels bounded by the axis-aligned rectangle with opposite corners at (0,0) and (x, y).

For each segmentation mask, the camera parameters can be used to project a voxel or pixel from the region in the reference coordinate system onto a point in a segmentation mask in a camera coordinate system. A decision can be made about the probability of a voxel being within a surface of the object based on the projection. For example, the decision can be based on a confidence or uncertainty value associated with the camera parameters used to project a voxel and/or a confidence or uncertainty value associated with the segmentation mask the voxel is projected onto. In an embodiment, the probability can be based on the confidence or uncertainty value associated with the camera parameters used and/or the confidence or uncertainty value associated with the segmentation masks.

For example a shape of a window the projected voxel is associated with can be defined. It should be noted that the shape can be any shape as may include a rectangle, a square, a free form shape, etc. The shape can be based on the confidence or uncertainty associated with the camera parameters used and/or the confidence or uncertainty associated with the segmentation masks. In an embodiment, the larger the window, the more uncertain the calibration is. An example of a large window can be a window including more than 1000 pixels. An example of a small window can be a window including 20 pixels. Determining the probability values can include determining a number of pixels inside and outside the contour within the window. For example, the window for a projected voxel may reside within the contour, outside the contour, or partially inside and partially outside the contour. For the window, a number of pixels outside the contour and a number of pixels inside the contour can be determined. A ratio of the number of pixels inside the contour and a total number of pixels can be determined. The ratio can be the probability value associated with the projected voxel. The ratio or value can represent a probability that the voxel is inside the surface of the object. The process is repeated for each voxel in the region, where each voxel is associated with a probability value between 0 and 1.

As described, the values represent the probability of a voxel being inside the surface of the object. A marching-cubes technique or other such technique can be used to generate a visual hull of the object based on the probabilities. For example, the marching-cubes technique can use a threshold to separate "inside" from "outside" regions of the surface of the object. The threshold may be chosen in accordance with a desired probability for the partial inclusion or exclusion of a voxel. For example, a value for this threshold can be the logarithm of 0.5, corresponding to a 50% probability. In an example, the probability value associated with each voxel is compared to a threshold probability value. Voxels associated with a probability value that satisfies the threshold are kept. Voxels associated with a probability value that does not satisfy the threshold, for example, is less than the threshold, can be discarded. Thereafter, for the voxels associated with a probability value that satisfies the threshold, at least one surface interpolation technique can be used generate an object mesh structure or other surface of the object. In embodiments, the object mesh structure can be used to generate to three-dimensional representation of the object, such as three-dimensional representation of the computer 320 illustrated in FIG. 3B. In this example, from a display of a client device, the object mesh structure can be manipulated to be viewed from different orientations. The appropriate object image can be overlaid on the object mesh structure so that when a given viewpoint of the object mesh structure is requested, the object image for that viewpoint is presented to a user.

Figure 4:
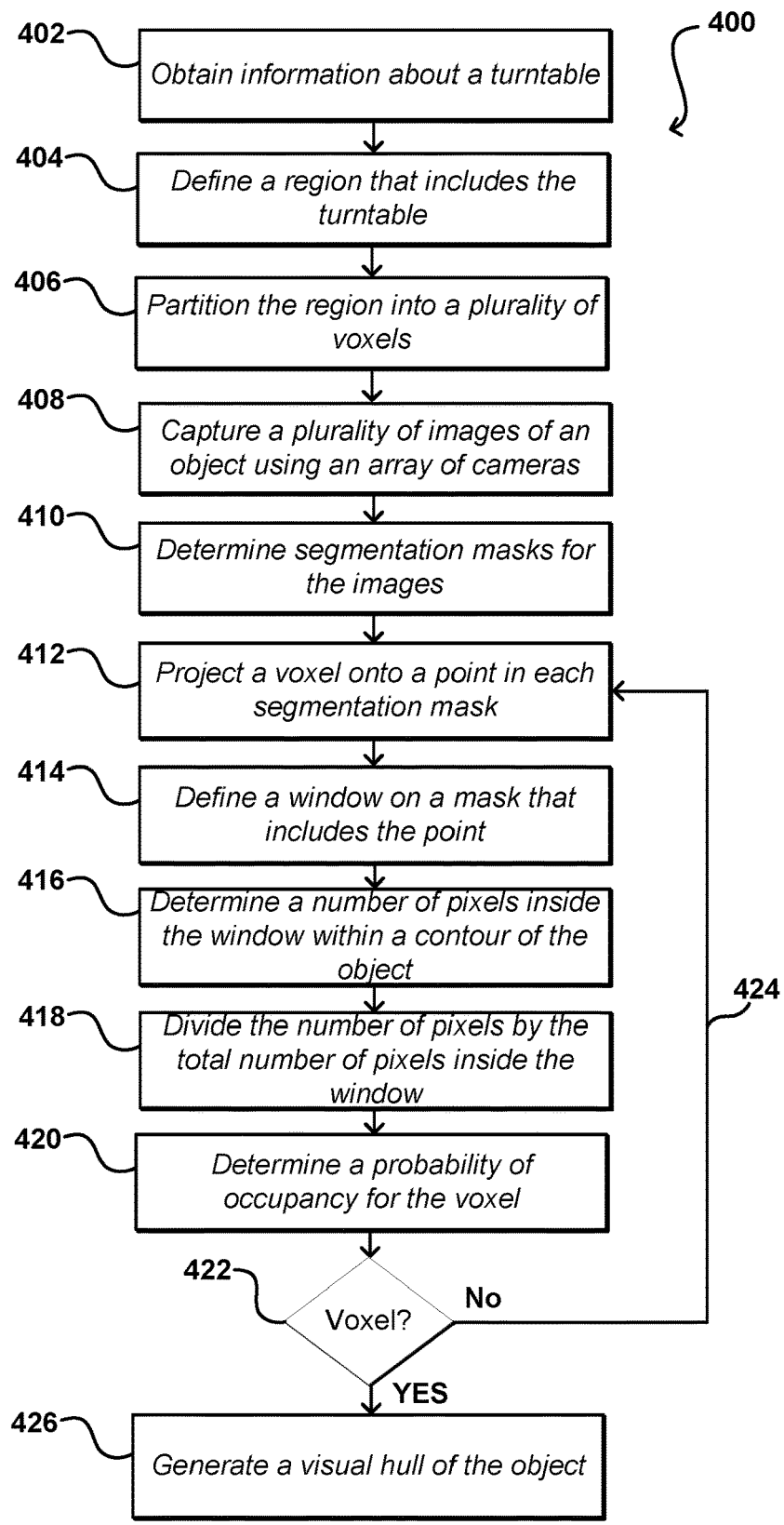
FIGS. 4, 5, and 6 illustrate example processes for creating multi-dimensional object representations that can be utilized in accordance with various embodiments.

FIG. 4 illustrates an example process 400 for creating multi-dimensional object representations that can be utilized in accordance with various embodiments. It should be understood that, for any process discussed herein, there can be additional, fewer, or alternative steps performed in similar or alternative orders, or in parallel, within the scope of the various embodiments. In this example, information about a coordinate system corresponding to an object or other reference point is obtained 402. In various embodiments, the object may be positioned on a surface (e.g., a turntable), suspended in air, etc. The information can be used to define 404 a region that includes the object. The region can be in the shape of, for example, a cube or other such shape, and can be associated with dimension information describing the dimensions of the cube. The region can be partitioned 406 into a plurality of voxels, sub regions, elements, partitions or other such partition. In an embodiment, individual elements can be referred to as a voxel or a pixel. A voxel can represent, for example, a value on a regular grid in three-dimensional space. In an embodiment, a scalar field in the region can be defined. For example, for a region R, each voxel V can have a value 0 such that the scalar field R(V)=0 for all V. The information for the coordinate system can include position information for the plurality of voxels, such as where those voxels are positioned within the coordinate system.

An initial set of camera parameters can be obtained or otherwise determined. For example, the initial set of camera parameters can be determined using a camera calibration technique. The set of camera parameters can be associated with a confidence or a measure of uncertainty value. The confidence or measure of uncertainty can be determined at the time of determining the camera parameters, based on expected values or changes in values of the camera parameters, or assigned at some other time as may include a direct determination and association process. One or more (e.g., a plurality) images can be captured 408, for example using an array of cameras as described with respect to FIG. 1. The images can include a representation of the object from different viewpoints. In an example, the images can include views of the object placed on a turntable or other such surface from a number of viewpoints, for example, in a hemisphere around the object. Segmentation masks that include a representation of the contour of the object represented in the images can be determined 410. For each segmentation mask and voxel, the camera parameters can be used to project 412 a center of a voxel onto a point onto a segmentation mask. A window can be defined 414 that includes the point. The shape of the window can be defined based on a measure of uncertainty of the camera parameters associated with the corresponding image or by a measure of uncertainty associated with the segmentation mask. The confidence or measure of uncertainty associated with the segmentation mask can be determined at the time of determining the segmentation masks, based on expected values of the segmentation masks, or assigned at some other time as may include a direct determination and association process. The number of pixels of the segmentation mask inside the window that are within the contour can be determined 416. This can include, for example, counting the number of pixels inside the window that are within the contour of the object. For each voxel projected onto the segmentation mask, the number of pixels inside the window within the contour is divided 418 by the total number of pixels inside the corresponding window to determine, for voxel V and image i, an estimate p_i of the probability of occupancy of each voxel. For example, each voxel can be processed by, for each image i, adding to the scalar field R(V) the logarithm of p_i. In an embodiment, if p_i is 0, add to R(V) an arbitrarily large negative value, and move on to process 424 another voxel. Once all voxels are processed, the visual hull of the object can be generated 426. This can include using a marching-cubes technique or other such technique to generate the visual hull of the object. In an embodiment, the marching-cubes technique can use a threshold to separate "inside" from "outside" regions of the scalar field R(V). The threshold may be chosen in accordance with a desired probability for the partial inclusion or exclusion of a voxel.

Figure 5:
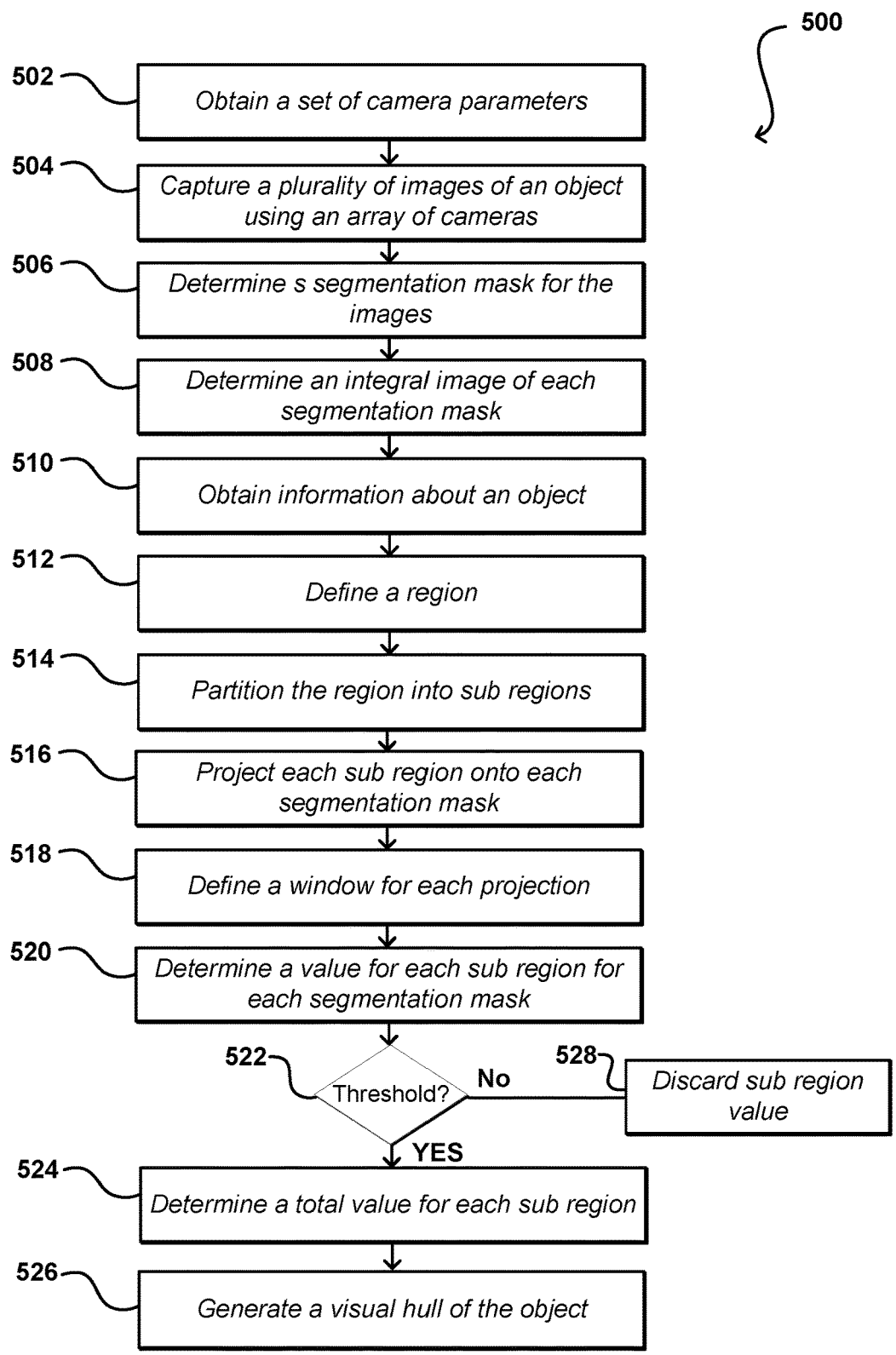

FIG. 5 illustrates an example process for creating multi-dimensional object representations that can be utilized in accordance with various embodiments. In this example, a set of camera parameters can be obtained 502 or otherwise determined. One or more (e.g., a plurality) images can be captured 504, for example using an array of cameras as described with respect to FIG. 1. The images can include a representation of the object from a number of viewpoints, for example. For each image, a segmentation mask corresponding to a silhouette of the object can be determined 506. In an embodiment, a segmentation mask can include a representation of a contour of the object. An integral image of each segmentation mask can be determined 508. In an embodiment, an integral image can be used to calculate a number of or a sum of values (pixel values) in a given segmentation mask—or a rectangular subset of a grid (the given segmentation mask). It can also be used to calculate the average intensity within a given image. In various embodiments, at least one summed-area table technique can be used to determine an integral image. Information associated with the object can be obtained 510. The information can include a coordinate system corresponding to the object and surface information describing a surface area and volume of the object with respect to a coordinate system. The information can be used to define 512 a region that includes the object. The region can be partitioned 514 into a plurality of sub regions. As described, the sub regions or partitions can include a voxel. In an embodiment, a voxel can represents a value on a regular grid in three-dimensional space. Initially, each sub region can be associated with a value of zero. Each sub region can be projected 516 onto each segmentation mask using the set of camera parameters. The projected sub regions can be associated with respective pixel locations (x, y) on each segmentation mask. For each projection, a window having dimensions (x, y) can be defined 518. The shape and/or dimensions of the window can be determined based on a measure of uncertainty of the calibration of the camera associated with the corresponding image or by a measure of the uncertainty in the segmentation mask. A value of each sub region representing a probability of that sub region being inside an object's surface can be determined 520. In an example, the value can be based on a ratio of the number of the pixels of the segmentation mask inside the window within the contour to a total number of pixels inside the corresponding window. This can repeat for each sub region for each segmentation mask. Individual values can be compared 522 to a threshold. Values for each sub region that satisfy the threshold can be added to a total value or other such scalar value associated with respective sub regions. As described, this can include adding to each sub region a logarithm of the values. A total value associated with each sub region can be determined 524 and used to generate 526 a visual hull of the object while values that do not satisfy the threshold can be discarded 528 or otherwise not used to determine the visual hull.

Figure 6:
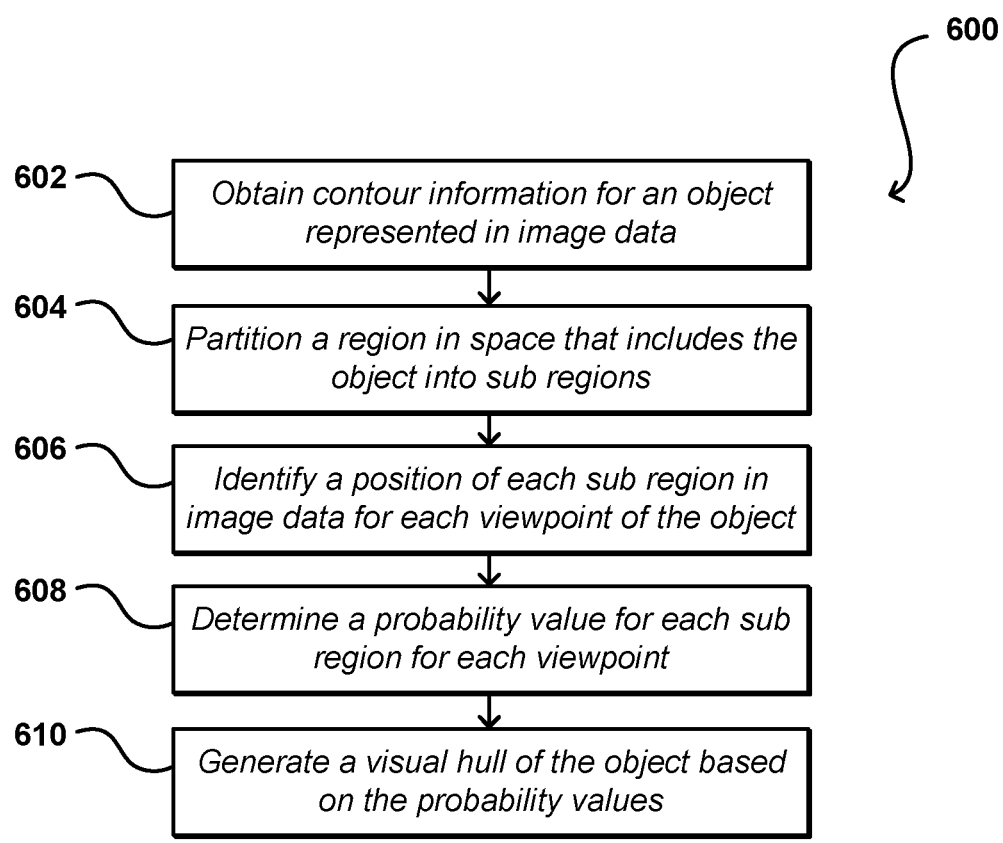

FIG. 6 illustrates an example process for creating multi-dimensional object representations that can be utilized in accordance with various embodiments. In this example, contour information for an object represented in image data for a plurality of viewpoints is obtained 602. The object can be associated with information describing a surface area and a volume of the object with respect to a reference coordinate system. As described, the image data can include one or more (e.g., a plurality) of images captured, for example using an array of cameras as described with respect to FIG. 1. The images can include a representation of an object from a number of viewpoints, for example. In an embodiment, determining the contour information can be achieved by using an edge detection algorithm to create an edge map. The edge detection algorithm can consider contrast changes in an image that are typically due to the presence of an edge. For example, to determine the object contours (e.g., the outermost edges), image data can be traversed from the image boundaries. The first pixels encountered while traversing the image data can be considered contour pixels, which, can refer to the pixels demarking the outer boundary of the object. Applying this process can isolate the contour pixels. A region of space that includes the object can be partitioned 604 into a plurality of sub regions. The region of space can be associated with the reference coordinate system. A position of each sub region can be identified 606 in the image data for each viewpoint. For example, a sub region in the reference coordinate system can be projected into a camera coordinate system associated with a segmentation mask. As described, the segmentation mask can be generated from the image data. Any one of a number of projection algorithms can be utilized to project a position in the reference coordinate system to a position in the camera coordinate system. A probability value can be determined 608 for each sub region indicating whether that sub region is within the surface of the object for each segmentation mask. As described, the probability value can be determined based on a confidence or uncertainty value associated with camera parameters used to project a sub region and/or a confidence or uncertainty value associated with the segmentation mask the sub region is projected onto. Once a total probability value for each sub region is determined, a visual hull technique can be used to generate 610 a visual hull of the object based on the probabilities. An example visual hull technique includes a marching cubes technique to map the probabilities to a visual hull of the object. Thereafter, the visual hull can be used to generate a three-dimensional representation of the object for a number of different viewpoints.

For example, an example mobile application running on a mobile device or other computing system can receive input of search parameters through a search field. For example, a user can search for lamps. Various lamps can then be presented to the user. In the situation where the user selects one of the lamps, the user can be shown a page with additional details about the user's selected lamp. A "See How It Looks" selection or similar prompt can be presented to a user. When selected, the user can interact with a rendering of the selected lamp.

One manner in which a user can interact with her selected item is through an augmented reality setting. Continuing the above example, the selected lamp can be viewed in a user's home so she can get a sense of how the lamp would actually look where she had planned to place it. For example, a user may plan to place the selected lamp in her living room on an end table next to a couch. The user can point the camera of her mobile device at the end table. Through the mobile device's display, the user can view a representation of the lamp placed on top of the end table. When viewing the representation of the lamp through the mobile device's display, the user can compare it to the color of the couch or the height of the end table to name two examples. The user can also rotate the representation of the lamp or move it around on the end table. This way, the user can understand how various items would look in her apartment before purchasing them.

Figure 7:
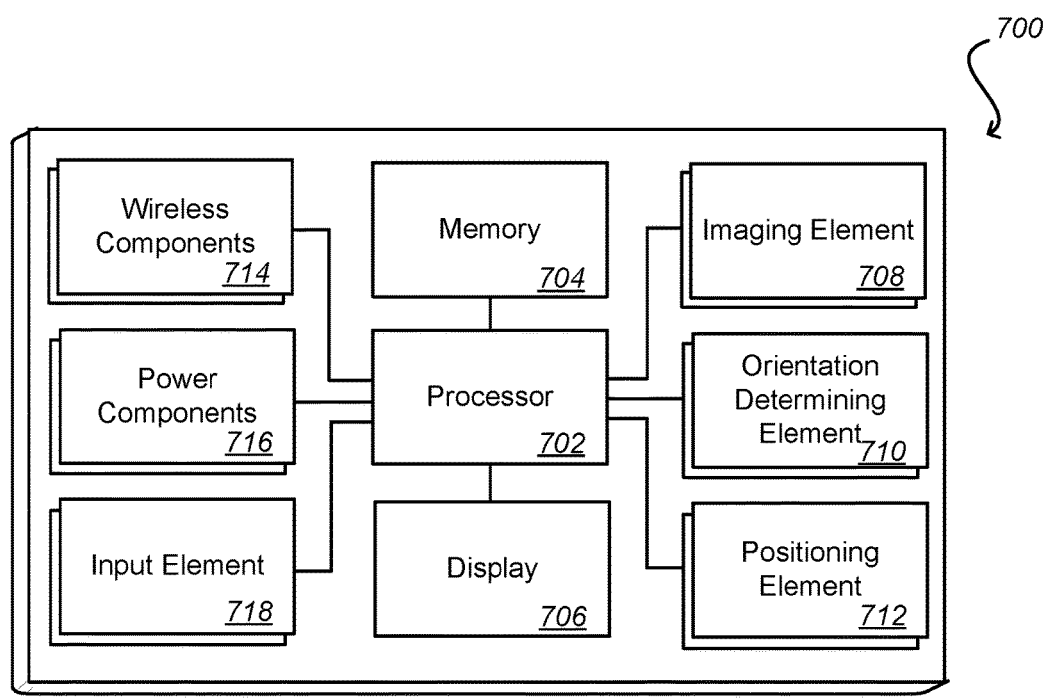
FIG. 7 illustrates a set of example components of one or more devices of the present disclosure, in accordance with various embodiments.
Figure 8:
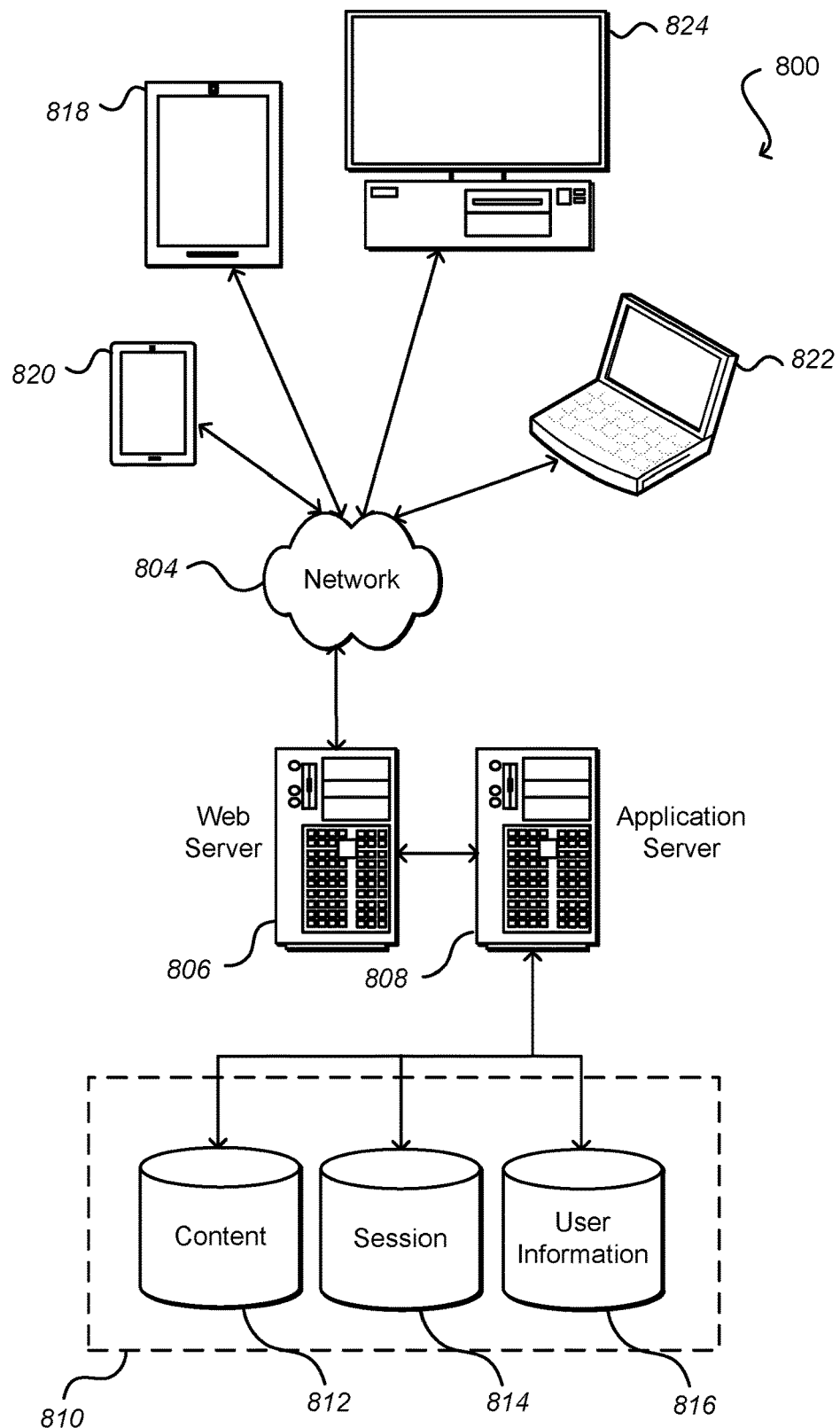
FIG. 8 illustrates an example computing environment that can be used to implement aspects of various embodiments.

FIG. 7 illustrates a set of basic components of an example computing device 700 that can be utilized to implement aspects of the various embodiments. In this example, the device 700 includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components, such as a port, network interface card, or wireless transceiver that enables communication over at least one network. The device can include at least one input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The device 700 can include one or more imaging elements 708. One or more orientation determining elements 710 can determine the orientation of the device, for example in relation to a user's face or eyes. Various camera-based and other sensors 710 can be used to determine orientation. A positioning element 712 can determine the position of the device. The positioning element 712 can use one or more of GPS, local network detection, Bluetooth connection, or other protocols. One or more input elements 710 can register user input, for example input received from a touch screen display. An example device 700 will also include power components 716 and wireless components 714 to communicate with other devices wirelessly.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment 800 includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store as needed to execute aspects of one or more applications for the client device and handling a majority of the data access and business logic for an application. The application server 808 provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server 806. It should be understood that the Web server 806 and application servers 808 are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store 810 illustrated includes mechanisms for storing content 812 (e.g., production data) and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store. The data store 810 is operable, through logic associated therewith, to receive instructions from the application server and obtain, update or otherwise process data in response thereto. In one example, a user might submit a search request for a certain type of item. In this case, the data store 810 might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server 806, 808 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment 800 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices 818, 820, 822, 824 which can be used to operate any of a number of applications. User or client devices 818, 820, 822, 824 can include any of a number of general purpose personal computers, such as desktop 824 or laptop computers 822 running a standard operating system, as well as cellular, wireless and handheld devices 818, 820 running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network 804 that would be familiar to those skilled in the art for supporting communications using any of a variety of commercially-available protocols, such as TCP/IP, FTP, UPnP, NFS, and CIFS. The network 804 can be, for example, a local area network, a wide-area network, a virtual private network, the Internet, an intranet, an extranet, a public switched telephone network, an infrared network, a wireless network and any combination thereof.

In embodiments utilizing a Web server 806, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment 800 can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   a computing device processor;
   a turntable;
   a camera associated with camera parameters; and
   a memory device including instructions that, when executed by the computing device processor, enable the computing system to:
      obtain information about a coordinate system associated with the turntable, the information including position information for various positions for a region that includes the turntable;
      partition the region into a plurality of elements, the plurality of elements associated with respective positions within the region;
      capture image data using the camera, the image data including a representation of an object from a plurality of viewpoints;
      generate a segmentation mask from the image data, the segmentation mask including a contour of the object;
      use the camera parameters to project an element to a position on the segmentation mask;
      identify a window that includes the position, the window associated with a dimension and a shape;
      determine a number of pixels of the segmentation mask inside the window within the contour;
      determine a ratio of the number of pixels and a total number of pixels inside the window, the ratio corresponding to a probability of occupancy; and
      generate a visual hull of the object based at least in part on the probability of occupancy.

2. The computing system of claim 1, wherein the instructions, when executed further enable the computing system to:
   determine a measure of uncertainty associated with the camera parameters; and
   set the dimension and the shape based at least in part on the measure of uncertainty.

3. The computing system of claim 1, wherein the instructions, when executed further enable the computing system to:
   compare the probability of occupancy to a threshold level of acceptable occupancy; and
   determine whether the element is inside or outside the contour based at least in part on the comparison.

4. A computing system, comprising:
   a computing device processor;
   a camera associated with a set of camera parameters;
   a memory device including instructions that, when executed by the computing device processor, enable the computing system to:
      capture image data using the camera, the image data including a representation of an object from a plurality of viewpoints, the object having a surface defining a volume of the object, the object being associated with a reference coordinate system;
      generate a segmentation mask from the image data, the segmentation mask including a contour of the object;
      identify a region that includes the object, the region partitioned into a plurality of sub regions, individual sub regions associated with a respective position in the reference coordinate system;
      identify a point in the segmentation mask associated with a sub region based at least in part on the set of camera parameters, the point included within a window; and
      determine a probability value of the sub region being inside the volume of the object based at least in part on one of a level of uncertainty in one of the camera parameters or the segmentation mask.

5. The computing system of claim 4, wherein the instructions, when executed further enable the computing system to:
   determine a measure of uncertainty associated with the set of camera parameters; and
   determine a shape of the window based on the measure of uncertainty.

6. The computing system of claim 4, wherein the instructions, when executed further enable the computing system to:
determine a plurality of probability values based at least in part on the plurality of sub regions; and
generate a visual hull of the object based at least in part on the plurality of probability values.

7. The computing system of claim 6, wherein the instructions, when executed further enable the computing system to:
receiving a request to display a representation of the object from a specified viewpoint; and
generate a three-dimensional view of the object at a specified viewpoint based at least in part on the visual hull.

8. The computing system of claim 4, wherein the segmentation mask includes (i) filled space, comprising pixels associated with the object, and (ii) unfilled space, comprising pixels not associated with the object.

9. The computing system of claim 4, wherein the instructions, when executed further enable the computing system to:
generate an edge map using an edge detection algorithm;
traverse the edge map from an image boundary;
determine that edge pixels first encountered are contour pixels; and
determine the contour based at least in part on the contour pixels.

10. The computing system of claim 4, wherein the instructions, when executed further enable the computing system to:
determine the set of camera parameters using at least one camera calibration technique.

11. The computing system of claim 4, wherein the instructions, when executed further enable the computing system to:
determine an integral image of the segmentation mask; and
use the integral image to determine a number of pixels of the segmentation mask inside the window within the contour and a total number of pixels inside the window.

12. The computing system of claim 4, wherein the instructions, when executed further enable the computing system to:
compare the probability value to a threshold probability level; and
determine whether the sub region is inside the volume of the object based at least in part on the comparison.

13. The computing system of claim 4, wherein the instructions, when executed to determine the probability value further enable the computing system to:
determine a ratio of a number of pixels of the segmentation mask inside the window within the contour to a total number of pixels inside the window.

14. The computing system of claim 4, wherein the image data includes a plurality of images, and wherein the instructions, when executed to provide information further enable the computing system to:
define a scalar field;
determine a plurality of segmentation masks from the plurality of images;
determine, for the sub region, a plurality of probability values based at least in part on the plurality of segmentation masks; and
add to the scalar field a logarithm of the plurality of probability values that satisfy a threshold probability.

15. The computing system of claim 4, wherein the plurality of sub regions includes a plurality of voxels.

16. The computing system of claim 4, wherein the object is positioned on a surface, the surface including a rotating turntable, and wherein the image data includes a plurality of images captured from a plurality of cameras positioned with respect to the surface.

17. A method, comprising:
capturing image data using a camera, the image data including a representation of an object from a plurality of viewpoints, the object having a surface defining a volume of the object, the object being associated with a reference coordinate system;
generating a segmentation mask from the image data, the segmentation mask including a contour of the object;
identifying a region that includes the object, the region partitioned into a plurality of sub regions, individual sub regions associated with a respective position in a reference coordinate system associated with the object;
identifying a point in the segmentation mask associated with a sub region based at least in part on a set of camera parameters associated with the camera, the point included within a window; and
determining a probability value of the sub region being inside the volume of the object based at least in part on a level of uncertainty in one of the camera parameters or the segmentation mask.

18. The method of claim 17, further including:
determining a plurality of probability values based at least in part on the plurality of sub regions; and
using a marching cubes technique to map the plurality of probability values to a visual hull of the object; and
generating a three-dimensional view of the object based at least in part on the visual hull.

19. The method of claim 18, wherein the three-dimensional view of the object can be rotated to be viewed from each of the plurality of viewpoints, and wherein the visual hull is overlaid by the image data corresponding to a viewpoint from which the visual hull is viewed.

20. The method of claim 18, further comprising:
capturing a client device environment through an image capture element of a client device; and
displaying the three-dimensional view of the object overlaying the client device environment.

* * * * *